UNITED STATES PATENT OFFICE.

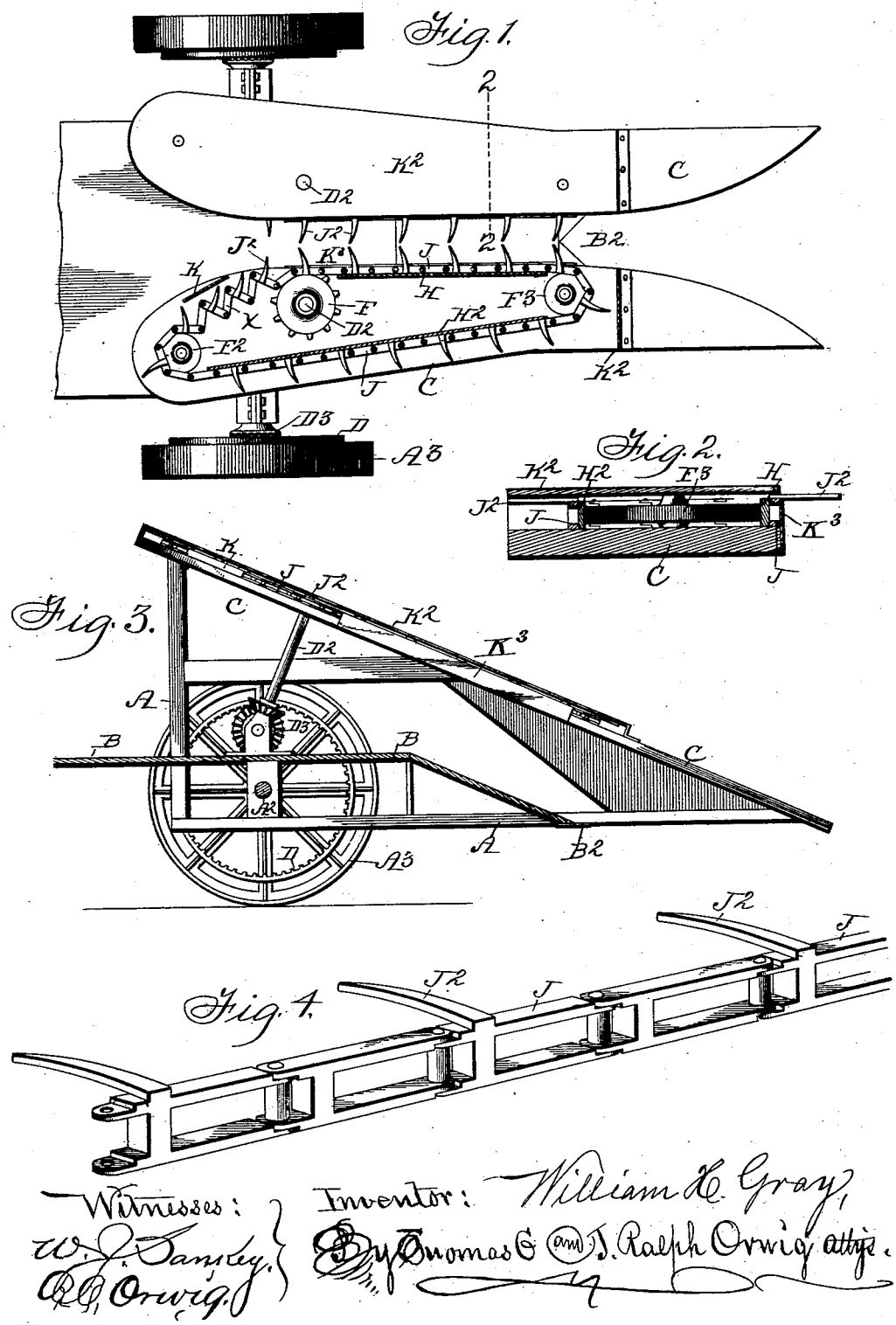

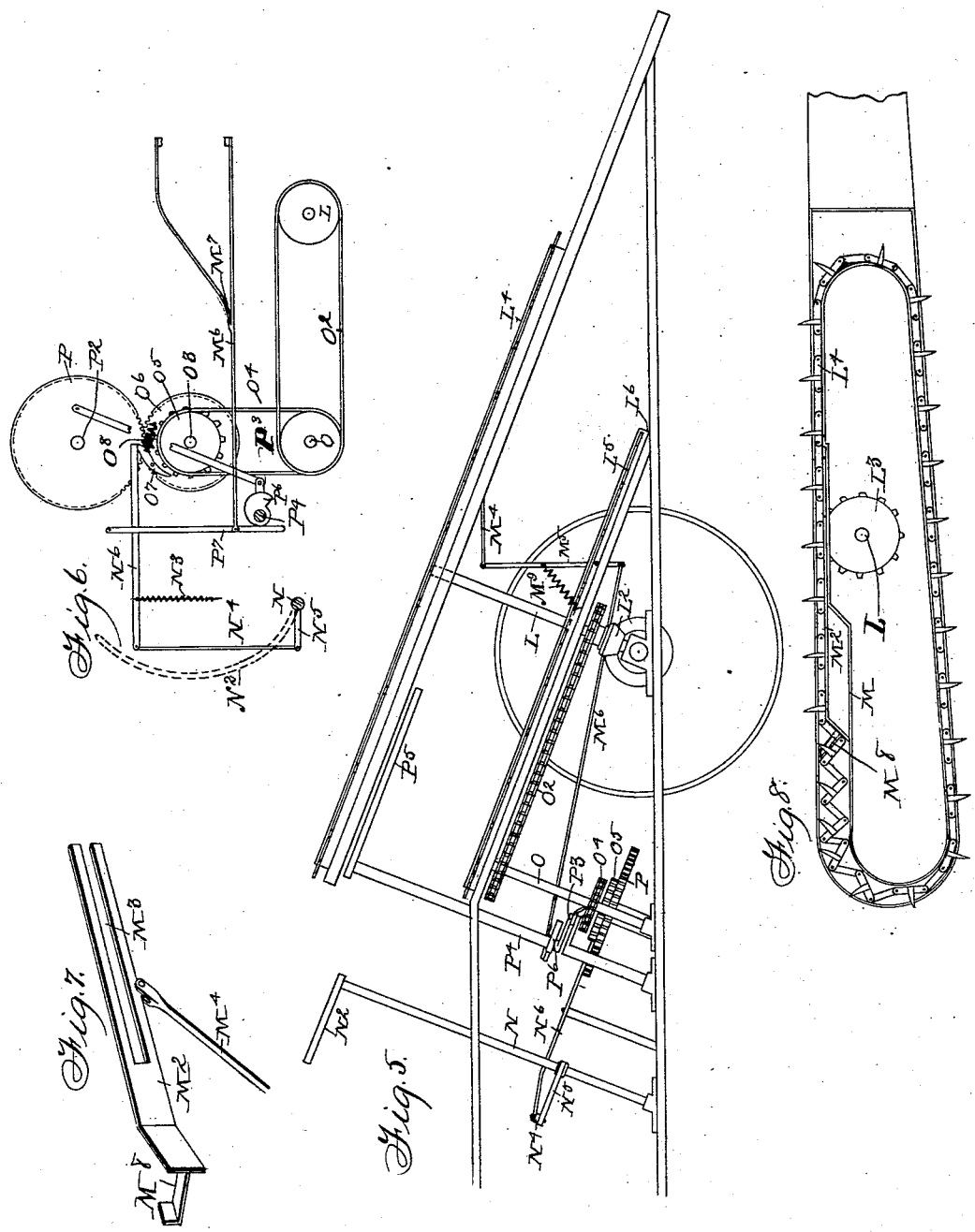

WILLIAM H. GRAY, OF EDDYVILLE, IOWA.

CORN-HARVESTER.

SPECIFICATION forming part of Letters Patent No. 572,110, dated December 1, 1896.

Application filed January 17, 1896. Serial No. 575,853. (No model.)

*To all whom it may concern:*

Be it known that I, WILLIAM H. GRAY, a citizen of the United States of America, residing at Eddyville, in the county of Wapello and State of Iowa, have invented certain new and useful Improvements in Corn-Harvesters, of which the following is a specification.

This invention relates to that class of harvesting-machines in which the harvester is drawn over a corn-field, the corn cut, and the severed stalks supported in an upright position while being conveyed to a gavel-forming platform in the rear of the machine.

My object is to provide simple, strong, and durable mechanism for automatically withdrawing the supporting-arms from the stalks as they are placed in the gavel in such a manner as to prevent the stalks from being caught by the arms.

My object is, further, to provide simple, strong, and durable means whereby all of the stalks of corn that enter into the formation of a shock will be forced into the gavel-former with an approximately equal pressure, that is, the stalk-carrying arms will convey the first stalks to the rear end of the gavel-forming platform before they are withdrawn, and when the gavel-platform is nearly full the stalk-carrying arms will be withdrawn when they have carried the stalks to the forward end of the gavel-platform, the withdrawal of said arms being effected upon their forcible engagement upon the cornstalks in the gavel-platform.

My invention consists in certain details in the construction of the cornstalk-carrying devices and the arrangement and combination, with the means for shocking the corn, of the mechanism for automatically changing the point at which the arms are withdrawn, as hereinafter set forth, pointed out in my claims, and illustrated in the accompanying drawings, in which—

Figure 1 shows a top or plan view of the complete harvester with part of one of the covers removed to reveal the stalk-conveying chain. Fig. 2 is a section through the line 2 2 of Fig. 1. Fig. 3 is a central longitudinal section of the complete machine. Fig. 4 shows a part of the stalk-carrying chain in perspective. Fig. 5 is a diagram taken from one side of the machine to show the relative arrangement and combination of the parts shown in detail in other views. Fig. 6 shows a diagrammatical top view of the slide-actuating mechanism. Fig. 7 shows a detail perspective view of the slide. Fig. 8 shows a detail plan view of the mechanism for advancing the cornstalks and withdrawing the arms from the corn.

I shall first describe in general terms the main features of the machine which are now in common use in order that the description of the novel features may be fully understood.

The reference-letter A is used to indicate the main frame mounted on the rotatable axle $A^2$, which has the traction-wheels $A^3$ on its ends.

B indicates a platform near the bottom of the frame, on which the butts of the stalks rest when being carried rearwardly and also when being formed into a gavel or shock. A cutting-knife $B^2$ is mounted in the forward central portion of this bottom piece.

C indicates two flat side pieces of similar contour, each having a pointed and outwardly-inclined forward end and extending to a point near the rear of the machine. They are inclined from their forward ends upwardly at any suitable angle, preferably about thirty degrees, with sufficient space between their adjoining edges to admit of the ready passage of a small number of cornstalks at one time, the rear inner edges being curved gradually outward to permit the formation of a gavel or shock at or near said rear ends.

The cornstalks are severed by the knife as the machine is advanced and the stalks carried rearwardly between the side pieces and assembled to form a gavel or shock in the rear of the side pieces. It is in this mechanism for conveying the stalks in an upright position to the platform at the rear of the machine that my invention consists.

On each of the traction-wheels is a cogged rim D, and mounted in each of the side pieces C at right angles thereto is a shaft $D^2$, arranged to be driven by power derived from the rim through the gears $D^3$. On the upper end of this shaft close to the top of the side pieces is a sprocket-wheel F, located near the point where the outward incline of the rear end of the side piece begins. $F^2$ indicates an idler mounted for rotation on the top of the rear end of the side piece, and F³ is a like idler near the forward end of the side piece.

H indicates a guide or track leading from a point near the inner edge of the idler F³ to a point in proximity to the inner edge of the sprocket F, and H² a like guide or track extending from the outer edge of the idler F² to a point near the outer edge of the idler F³. There is, however, no guide between the sprocket F and idler F².

J indicates a sprocket-chain having comparatively long straight links, each of which is made in one piece, as clearly shown in Fig. 4. Each alternate link is provided with an arm or spur J², formed on its top. The chain thus formed is passed around the sprocket and idlers and also around said guides or tracks. However, instead of being stretched taut about the wheels, as is customary, I provide several additional links, so that at some point the links must be folded or kinked upon each other, as at the point $x$ in Fig. 1.

The power is applied only to the sprocket-wheel F to drive the chain. When the arms or spurs thereon pass around the idler F³, they engage the cornstalks and carry them rearwardly, the arms or spurs being supported at approximate right angles until they pass over the sprocket F. Up to this point there is a drawing power exerted upon the chain and it is of course kept taut. After passing over the sprocket, however, the links are pushed from the sprocket and at the same time are held against advancement by the weight of the stalks that they bear, thus causing them to fold or kink, and that always with the links bearing the arms or spurs in position with said arms or spurs inclined slightly forwardly. Thus the arms or spurs are withdrawn from engagement with the stalks in such a manner that they may not become wedged between two stalks, inasmuch as they are capable of flexion in any direction.

K indicates a short partition to prevent stalks or leaves from entering between the side pieces C and the covers K² on top of the side pieces at the rear end of the side pieces and also to aid in folding or kinking the chain at the proper point if it should not act automatically.

K³ indicates a strip fixed to the inner edge of the part C between the idler F³ and sprocket F to support the arms or spurs J² against downwardly-applied pressure.

In the modified form of the device illustrated on Sheet 2 of the drawings power is applied to a shaft L from the driving-axle by means of the bevel-gears L², and this shaft rotates the sprocket-wheel L³, that moves the chain L⁴, which is similar in construction to the chain J in the other form of device. A like chain L⁵ is mounted in a suitable track L⁶ at the lower portion of the machine. This lower carrier, however, need not be provided with means for withdrawing the arms and is driven from the same shaft L. This upper chain is mounted in a continuous track, which is constructed to hold the arms in a horizontal position and approximately at right angles to the track. It is, however, widened at M, that is, from a point in the rear of the sprocket L³ to the rear curve, so that the links may kink at that point. It has been found desirable to have the links kink and hence withdraw the arms at the point where the stalks begin to be pressed tightly against the other stalks in the gavel, and as the accumulation of stalks increases it is desirable to move this point forwardly. I have provided means for accomplishing this automatically, as follows:

M² indicates a slide mounted in the track at the intersection of the narrow and enlarged portions thereof. When at its rearward limit, this slide narrows the track so that the links cannot kink until past the end of the slide, and as the slide is moved forwardly the links may kink nearer to the sprocket L³. The slide is slotted at M³ to admit said sprocket. M⁴ indicates a rod attached to the slide and pivoted to a lever M⁵, that in turn is fulcrumed to the machine-frame. M⁶ indicates a rod connected with said lever. It is forked at M⁷ to connect with a like lever on the opposite side of the harvester, it being understood that the devices on each side of the harvester are identical and that the same actuating mechanism operates both slides. M⁸ indicates an arm projecting rearwardly and upwardly from the slide to overlap the slot in the front of the track and thus cause the links to kink by a positive engagement therewith.

M⁹ indicates a contractile coil-spring by which the slides M² are returned automatically after they have reached their forward limit.

It is common in harvesters of this class to provide means for automatically forming the stalks into shocks. It is to this mechanism that I have attached the means for moving the said slides. In the drawings the shock-forming mechanism is illustrated merely to show one practical way of shocking cornstalks and the manner in which I attach the slide to this mechanism.

N indicates an upright rock-shaft having fixed to its top an arm N², curved backwardly and then across the rear end of the machine to normally support the cornstalks on the gavel-platform. An arm N⁵ is attached to the shaft N and extends rearwardly therefrom. A rod N⁴ is pivoted thereto and extends across the machine-frame. A lever N⁶ is attached to the other end of this bar N⁴, and an extensile or expansive spring N³ is attached to the said lever and to a part of the machine-frame to normally hold the rear end of said lever outwardly, and hence hold the arm N² in a position across the platform, and also hold the pawl O⁷ out of engagement with its ratchet.

O indicates a shaft rotated during the advancement of the machine by means of the chain-gearing $O^2$. This shaft O serves to transmit motion to the shaft $O^3$ on the opposite side of the machine through the chain-gearing $O^4$. $O^5$ indicates a ratchet-wheel fixed to the shaft $O^3$, and $O^6$ a gear-wheel loosely mounted on the same shaft beneath the ratchet. $O^7$ indicates a spring-actuated pawl pivoted to the gear-wheel $O^6$ to normally engage the ratchet-wheel $O^5$, and $O^8$ indicates an extensile coil-spring attached to said wheel $O^6$ and pawl $O^7$ to normally hold the pawl in engagement with the ratchet $O^5$. These parts are so disposed relative to each other that when the arm $N^2$ is moved rearwardly the lever $N^6$ is pressed against the pawl and said pawl is therefore released and made to engage the ratchet-wheel. Hence the gear-wheel $O^6$ is rotated. This gear-wheel is normally meshed with a like wheel P on a shaft $P^2$ and a pitman connected therewith and with a crank $P^3$ on the shaft $P^4$. (This latter shaft has a binding-needle $P^5$ on its upper end.) $P^6$ indicates a cam on the shaft $P^4$ to engage a lever $P^7$, to which the rod $M^6$, hereinafter described, is pivoted. From this description it is obvious that when the pressure of stalks on the arm $N^2$ becomes great enough to overcome the force of the spring $N^3$ the lever $N^6$ will be withdrawn or swung outwardly and out of engagement with the pawl $O^7$, and the pawl $O^7$ will be thrown into engagement with the ratchet $O^5$ by the extensile spring $O^8$ and the lever $P^7$ operated thereby to advance the slides. This tripping mechanism, as shown, is obviously crude. It is, however, the best that I have yet devised and is theoretically practical and carries out the central idea of my invention, which, stated broadly, is the provision of an arm to extend across the rear end of the machine and which when the pressure of the stalks of corn thereupon becomes too great will force the said arm backwardly, which movement is made to throw in gear a wheel with another wheel that is constantly rotated during the advancement of the machine. Thus a positive motion is provided which is transmitted through suitable mechanism (of which many forms could be made) to move the slides forwardly. Then as soon as the stalks are removed from the platform the slides are automatically moved backwardly and said arm moved forwardly by spring-pressure.

I do not desire to be understood as limiting my invention to the construction of the shock-forming mechanism shown and described; but What I do claim as new, and desire to secure by Letters Patent of the Unites States therefor, is—

1. The combination in a corn-harvester or the like, of a sprocket-chain arranged to move in a horizontal plane, wheels for driving and supporting the chain so arranged as to permit several of the links to fold or kink upon each other and a guide located between two of said driving or supporting wheels to prevent the links from folding or kinking at that point, for the purposes stated.

2. The combination in a corn-harvester, or the like, of a sprocket-wheel, means for driving the same, two idlers mounted in the same plane at opposite sides thereof, a track leading from one idler to the sprocket, a sprocket-chain passed around said sprocket-wheel and idlers and having a number of links sufficient to permit some of them to fold or kink, and arms or spurs on some of the links for the purposes stated.

3. In a harvesting-machine a carrier for cornstalks and the like comprising two like side pieces, each having its inner edge straight at its central portion and curved outwardly at its rear end, a sprocket-wheel mounted therein near the beginning of said curve, means for driving the sprocket-wheel, an idler at each end portion of the side piece, a track leading from the forward idler to the sprocket, a track leading from the rear idler to the forward one a sprocket-chain having an outwardly-projecting spur on each alternate link, passed around said sprocket and idlers and having a number of links sufficient to permit some of them to fold or kink in the rear of the sprocket-wheel substantially as set forth.

4. In a corn-harvester or the like the combination of a suitable continuous track, rounded at its ends, and widened at a certain point, of a sprocket-chain mounted for movement on said track and of such a length that some of the links may fold or kink at said widened portion, arms fixed to and projecting outwardly from some of the links, a sprocket-wheel located directly in advance of the said widened portion of the track to engage the chain and means for driving the sprocket-wheel.

5. In a corn-harvester or the like, the combination of a suitable continuous track, comprising a flat bottom, a solid back, a slotted front and a widened portion, as set forth, of a sprocket-chain mounted for movement in said track and of such a length that some of the links may fold or kink in said widened portion, suitable arms projecting outwardly therefrom through said slotted front, a sprocket-wheel to engage said chain mounted in advance of the widened portion of the track and means for operating the said sprocket.

6. The combination in a corn-harvester or the like, having a suitable track rounded at its ends and widened at a certain point, a sprocket-chain mounted for movement on said track and of such a length that some of the links may fold or kink at said widened portion and means for driving said chain from a point in advance of the widened portion, of a slide mounted in said widened portion of the track, designed when moved therein to cause the links to fold or kink at different distances from the said chain-driving means and means for moving said slide.

7. The combination in a corn-harvester or the like, having a suitable track rounded at its ends and widened at a certain point, a sprocket-chain mounted for movement on said track and of such a length that some of the links may fold or kink at said widened portion and means for driving said chain from a point in advance of the widened portion, of a slide mounted in said widened portion of the track, designed when moved therein to cause the links to fold or kink at different distances from the said chain-driving means, an automatic shock-forming device located on the machine-frame and means connected therewith for advancing said slide when a certain predetermined quantity of stalks are assembled on the machine-frame, substantially as and for the purposes stated.

WM. H. GRAY.

Witnesses:
 I. S. RIGGS,
 GEO. MAHAFFEY.